(12) United States Patent
Ortega et al.

(10) Patent No.: US 12,117,100 B2
(45) Date of Patent: Oct. 15, 2024

(54) DATA RETRIEVAL, EVENT RECORDING AND TRANSMISSION MODULE CONNECTABLE TO SAFETY AND RELIEF VALVES

(71) Applicants: Carlos Maria Ortega, Buenos Aires (AR); Iris Monica Rabboni, Buenos Aires (AR); Gustavo Alejandro Mutz, Buenos Aires (AR)

(72) Inventors: Carlos Maria Ortega, Buenos Aires (AR); Iris Monica Rabboni, Buenos Aires (AR); Gustavo Alejandro Mutz, Buenos Aires (AR)

(73) Assignees: Carlos Maria Ortega, Buenos Aires (AR); Iris Monica Rabboni, Buenos Aires (AR); Gustavo Alejandro Mutz, Buenos Aires (AR)

( * ) Notice: Subject to any disclaimer, the term of this patent is extended or adjusted under 35 U.S.C. 154(b) by 203 days.

(21) Appl. No.: 17/758,183

(22) PCT Filed: Jan. 3, 2020

(86) PCT No.: PCT/IB2020/050035
§ 371 (c)(1),
(2) Date: Jun. 29, 2022

(87) PCT Pub. No.: WO2021/136973
PCT Pub. Date: Jul. 8, 2021

(65) Prior Publication Data
US 2022/0373100 A1    Nov. 24, 2022

(51) Int. Cl.
*G01N 29/14*   (2006.01)
*F16K 37/00*   (2006.01)
(Continued)

(52) U.S. Cl.
CPC ......... *F16K 37/0083* (2013.01); *G01H 11/08* (2013.01); *G01M 3/24* (2013.01); *G01N 29/14* (2013.01)

(58) Field of Classification Search
CPC ............. F16K 37/0083; F16K 37/0041; F16K 37/005; F16K 17/04; G01H 11/08;
(Continued)

(56) References Cited

U.S. PATENT DOCUMENTS 6,283,138 B1    9/2001  Friend et al.
7,318,350 B2 *  1/2008  Boken .................... G01N 29/38
                                                           73/592
(Continued)

FOREIGN PATENT DOCUMENTS

JP    S5398588    8/1978
JP    S5550157    4/1980
(Continued)

*Primary Examiner* — Suman K Nath
(74) *Attorney, Agent, or Firm* — Defillo & Associates, Inc.; Evelyn A. Defillo

(57) ABSTRACT

Data retrieval, event recording and transmission module connectable to safety and relief valves. The module (10) coupled to safety or relief valves for the measurement, transmission and recording of events and includes a rigid and inextensible at room temperature longitudinal element defining an acoustic emission waveguide (12) that transmits vibrations. The end (12a) of (12) is in intimate contact with a portion (2) or (1) of the valve, and its other end (12b) penetrates inside a closed resistant box (10), wherein it sits in contact against at least one acoustic emission sensor (13) receiving a signal proportional to the vibrations transmitted by the waveguide (12).

9 Claims, 9 Drawing Sheets

(51) Int. Cl.
*G01H 11/08* (2006.01)
*G01M 3/24* (2006.01)

(58) Field of Classification Search
CPC .......... G01M 3/08; G01M 3/24; G01N 29/14;
G01N 29/28; G01N 29/42
See application file for complete search history.

(56) References Cited

U.S. PATENT DOCUMENTS

| | | |
|---|---|---|
| 9,494,560 B2 * | 11/2016 | Carder ................. G01N 29/245 |
| 2003/0019297 A1 | 1/2003 | Fiebelkorn |
| 2005/0126639 A1 | 6/2005 | Wolfmang |
| 2008/0121290 A1 | 5/2008 | Pape |
| 2010/0192677 A1 | 8/2010 | Puettmer |
| 2010/0236319 A1 * | 9/2010 | Penman .............. F16K 37/0083 |
| | | 73/1.72 |

FOREIGN PATENT DOCUMENTS

| | | |
|---|---|---|
| JP | S57158550 | 9/1982 |
| JP | S5917079 | 1/1984 |
| JP | S6119731 | 2/1986 |
| JP | H02154881 | 6/1990 |
| JP | 2006208122 | 8/2006 |
| JP | 2010054434 | 3/2010 |

* cited by examiner

DATA RETRIEVAL, EVENT RECORDING AND TRANSMISSION MODULE CONNECTABLE TO SAFETY AND RELIEF VALVES

CROSS REFERENCE TO RELATED APPLICATION

This application is a national stage entry of PCT/I62020/050035 filed Jan. 3, 2020, under the International Convention.

FIELD OF APPLICATION OF THE INVENTION

The present invention deals with a module selectively and externally attached to a state-of-the-art safety valve, also known as "relief valve", capable of providing the detection of events, their duration, registration, data transmission and/or storage of data pertaining to historical events detected while said valve is in active mode.

PRIOR ART

The use of safety and relief valves is a well-established feature. They are known in the art as "PSV" devices by their technical name (Pressure Safety Valve) and consist of autonomous mechanical devices installed where there is a pressure line or conduit, understanding as such any system wherein a fluid is subjected to high operating pressures, to ensure that in the event of any process anomaly the valve acts discharging the necessary amount of fluid to re-establish the normal operating pressure conditions of the device which they must protect.

Pressure vessels and pipe or conduits systems are often designed with pressure relief valves placed at several locations to protect the pressure line from excess overpressure in the course of unitary or mass transfer operations. Pressure relief valves are self-actuated devices configured to open when the inner pressure in the pressure line exceeds a specified level inside the enclosure or container ensuring its protection from excess overpressure. Working under safety conditions the relief valve is rated to establish the opening of a shutter device at determined nominal values. Said pressure relief valve shutter device generally consists of a plate resting in hermetic sealing relationship on a seat at the end of a nozzle. This shutter device is normally closed and urged in its closing mode by elastic compression means. When faced with excess pressure exceeding said rated closing force determined by said elastic compression means, said shutter device is pushed by the internal pressure and moves away from the nozzle seat, allowing the fluid to flow out of the pressure line to the outside, producing the relief of the internal pressure, thereby avoiding damage to the device served by said valve, thus often avoiding major accidents. This fluid flow will continue to exit said valve at a rate sufficient to prevent the internal pressure from rising above a predetermined safety level or above a specified overpressure. When the inner pressure in the pressure line drops to levels below the rated pressure at which the relief valve opens, the shutter device of said relief valve will return to its sealing position, preventing additional flow exiting from the pressure line. Consequently, under normal operating conditions the closure or shutter element of the pressure relief valve will return to its normally closed mode.

The known prior art pressure monitoring devices typically employs position transducers mounted on the pressure relief valve sensing the position of the shutter component. These position transducers transmit analogical signals indicating the position of the shutter element in relationship to the inlet nozzle. However, these devices usually fail storing this information useful to determine the operating characteristics of the pressure relief valve, such as the total flow through the pressure relief valve during a specified time interval when the pressure relief valve is open.

Under certain conditions, these safety or pressure relief valves may be subjected to an unstable operating regime, caused by a fast opening and closing sequence the shutter element, whenever the inner pressure increases just or slightly above the rated pressure opening values and then drops below same, as a result of the fluid outlet flowing from the system through the pressure relief valve. Therefore, as soon as the shutter element is lifted from its sealing seat, elastically loading the calibrated compression spring, said spring immediately returns the shutter element to its sealing position. However, such unstable operation may cause physical damage to the pressure relief valve components. Hence, it is desirable to know when such unstable operation takes place in order to allow taking a corrective action.

The known prior art acknowledges the existence of safety valves capable of registering their status, emitting alarms and generating a historical record based on the opening and/or closing shutter plate and devices are even known capable of providing a signal in the event of loss or leaks in the closure of said shutter plate.

On the other hand, the prior art recognizes two fundamental problems found in the installation and operation of these relief valves:

i—Said valves have a fluid inlet nozzle in direct communication with the equipment subjected to internal pressure, said valve being as mentioned in a normally closed mode, so that if the pressure does not exceed the safety limits, the presence of the valve theoretically does not imply any loss of flow, but as kwon, the fluids can carry impurities interposing themselves between the seat and the shutter plate. Also, a valve subjected to successive opening and closing events deteriorates its closing seat, producing a permanent loss flow which may even increase in time.

ii—Some fluids, whether in gaseous or liquid state, depending on the industrial process served by the equipment having said safety valves may present flammable conditions or may directly produce explosions against the action of electrical discharges, including parasitic discharges.

These two conditions have produced in particular two distinct valve's constructions, namely:

a) The relief valves marketed by the firm FARRIS VALVE, basically consisting of a sensor capable of detecting the position of the stem or rod associated with the position of the shutter plate, registering the valve's opening and closing events and the time lapse time wherein said valve remained in its "open" mode, thereby enabling to estimate the relief flow delivered by the valve, but it does not record the flow losses due to shutter failures.

b) Valves according to U.S. Pat. No. 6,283,138 B1 are also known. This document teaches a structure comprising a plurality of sensors individually linked to the valve body through perforations made in the valve's casing; the plurality of signals obtained individually by each sensor is introduced in a signal input module. One of these signals is related to the measurement of losses (see column 4, lines 45 to 50) provided by a piezoelectric arranged in a perforation of the casing in proximity to the valve nozzle seat.

Drawbacks Found in the Cited Prior Art

The vast majority of relief valves known in the art do not have any event recording means. The FARRIS-type valves, as already mentioned, allow recording only the valve's opening event, and its opening and closing time through a mechanical sensor determining the position of a stem or rod associated with the shutter plate. As is known, all mechanical sensors tend to have a degree of inaccuracy, and furthermore, the FARRIS valves do not allow detecting the loss of flow, much less the magnitude of said loss.

The valves taught by U.S. Pat. No. 6,283,138 B1, although they partially fulfil their purpose, have a number of disadvantages:

First of all, said valves according to this patent have a number of passages penetrating its valve body casing. Obviously, each orifice presents a mechanical resistance weakening centre compromising the valve as a whole, constituting possible centres of fluid losses;

Each of these holes or passages has a relevant machining cost, which means that the valve must leave the factory with the sensors already installed. Otherwise, if the teachings of this U.S. Pat. No. 6,283,138 B1 were to be applied to valves already installed and in operation, it would be necessary to disassemble said valve, possibly install another device to replace it, take the valve to the workshop, machine it, and reinstall it, with an overall abusive cost.

If the fluid under treatment is capable of producing explosions or fires,

It must be noticed that according to this U.S. Pat. No. 6,283,138 B1 the piezoelectric is directly connected to the inside of the valve's nozzle, risking electrical discharges in communication with said fluid.

Objects of the Present Invention

It is a first object of the present invention to provide a modular device fitted entirely outside the body of any existing safety valve, without modifying said valve and without having to carry out any drilling or machining in said valve's body, being this modular device capable of detecting, communicating and eventually recording all the events taking place inside said relief valve.

It is an object of the invention to provide said modular device being easy to install with overall low fitting costs, further without altering either the layout or performance of a pre-existing valve.

It is another object of the invention to provide said modular device capable of detecting and quantifying the eventual fluid losses due to failures in the sealing closure of the nozzle of said valve.

It is yet another object of the present invention that said modular device constitutes a hermetic enclosure, explosion proof, and without having direct physical contact with the inner components of said relief valve.

It is also an object of the present invention a modular device, with very low manufacturing, installation and maintenance cost compared to prior art devices capable of providing at least some of the characteristics and operating results of the modular device of the invention.

It is also an object of the invention a modular device provided with a plurality of sensors capable of sensing variables of diverse nature, such as pressure and temperature of the fluid under control, housing all said sensors within said hermetic, explosion-proof enclosure, preventing the fluid under control from entering the interior of said enclosure.

It is also an object of the invention to provide real-time control of the four main events influencing the operation of the valve, namely, opening, relief or discharge time, valve closure and leak detection through the use of a sensor.

SUMMARY OF THE INVENTION

DATA RETRIEVAL, EVENT RECORDING AND TRANSMISSION MODULE CONNECTABLE TO SAFETY AND RELIEF VALVES, characterized by having a longitudinal rigid component, inextensible at room temperature, defined as a "waveguide" in terms of acoustic emission, capable of transmitting events originating inside the valve; one of the ends of said longitudinal element is placed in intimate contact with a portion of the outer casing of said valve, while its other end penetrates inside a hermetically closed box, wherein it seats in intimate contact against at least one sensor means capable of sensing vibratory signals within said hermetically sealed box transmitted from the inside of said valve by said rigid component; at least one acoustic emission sensor means emits a signal proportional to the vibrations transmitted by said waveguide, feeding said vibrations into an electronic circuit defined by a high pass filter multiple frequency selector; the output of said high pass filter enters a voltage limiter whose output is divided into two branches; one of these branches measures transient states signals and it includes an on-line amplifier followed by RMS values meter, while the other branch measures continuous signals; the output of both branches enters an analogic selector key capable of selecting the analogic variable to be converted, said key being commanded by a controlling medium; the output of said analogic key enters an ADC converter medium whose output feeds the input of an information communication medium placed at the outside of the module, emitting a transmissible, readable or recordable signal.

In order to exemplify the preferred embodiments of the present invention, the following illustrative drawings are attached, in support of the description of said constructions given below, and these embodiments should be interpreted as one of the many possible constructions of the invention, not being appropriate to assign any limiting value to this instant disclosure, including into same all possible means equivalent to those illustrated within the scope of protection of the invention; the breadth of the present invention being determined by the first attached claim in the corresponding Claims chapter.

Likewise, in these Figures, the same references identify the same and/or equivalent means.

Theoretical Considerations Applicable to the Present Invention

The acoustic emission can be associated with two types of events: transient events, such as the opening and closing of a valve, and continuous events, in this case indicative of constant flow losses in the valve shutter.

While transient events can be measured in terms of Volts/seconds, continuous events are measured in VRMS (Volts Root Mean Square), which integrates squared values over a period of time.

It has been found that a safety or relief valve can be permanently monitored by means of an acoustic emission sensor, recording transient and continuous events, making it possible to establish the four possible states of the valve: opening, relief discharge, closure and permanent losses (if any).

As is known, it is possible to instrument the output of the signals to SCADA-type control and communication boards, enabling remote reading of the signals.

General Considerations Governing the Operation of Relief Valves

Figure 1:
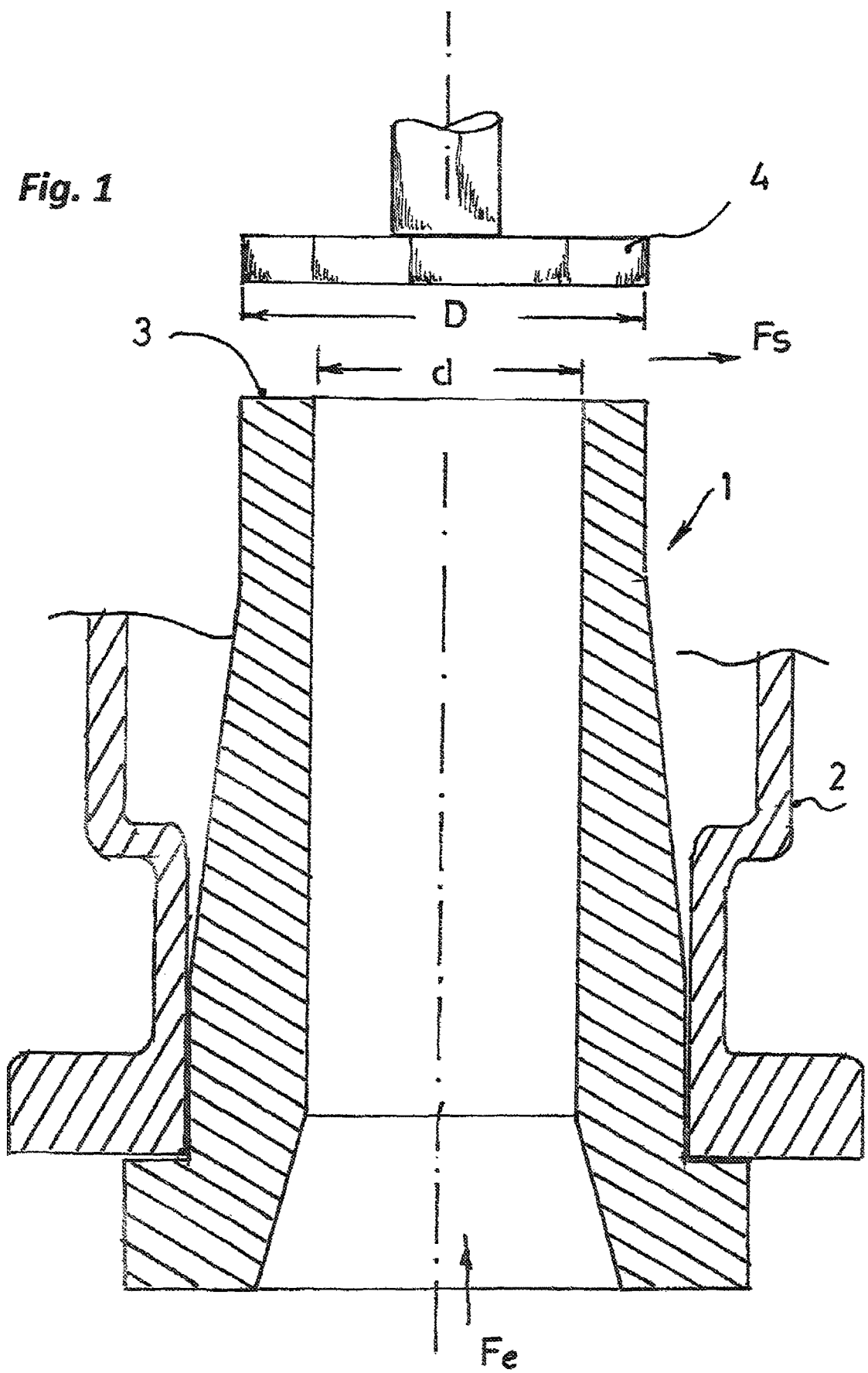
FIG. 1 is a simplified schematic representation in vertical section of a typical state of the art nozzle belonging to a safety valve.

FIG. 1 shows the schematic and simplified diametric section of a nozzle (1) in communication with the object (not illustrated) to which it applies protecting same from overpressure events. Said object, can be from a pipe, a container, a mass transfer reactor, etc., has a fluid stream flow <Fe> with an internal pressure which acts at all its points inside the nozzle (1) because it is in direct communication with it. Said nozzle is integral with the valve body (2) which constitutes the casing with which said nozzle (1) is integral. When the pressures are within the operative range for which the device under pressure has been dimensioned, the sealing plate (4) sits on the rectified edge (3) of the upper end of the nozzle and said shutter's plate (4) will being constantly urged against said seat providing an hermetic sealing closure by an elastic means (5) (see FIGS. 3 and 4) such as a compression spring calibrated to be overcome by a force F=Pressure×Surface in excess of the force applied on the shutter by said spring.

When the inner pressure P exceeds the safety value nominal closing force, it acts on the surface of the plate subjected to said pressure, determined by the surface of the internal diameter <d> of the end of the nozzle. Said plate (4) is integral or linked by means of the rod (9a) to a base (9) of spring (5), forcing the plate to rise loading the spring (5), which reacts against an upper partition (9b) fixed inside the valve body (2). The above mentioned construction is generic and merely indicative of the components of a typical relief or safety valve. When the plate (4) is raised and releases the sealing on seat (3), the pressure suddenly acts on a larger surface of the plate (4), determined by its maximum diameter <D>, with which at the beginning of the pressure relief, the outgoing fluid stream <Fs> acquires a sudden high speed due to the sudden increase in force F (see FIG. 1) driving the plate upwards, producing sound waves of high magnitude and frequency.

Figure 2:
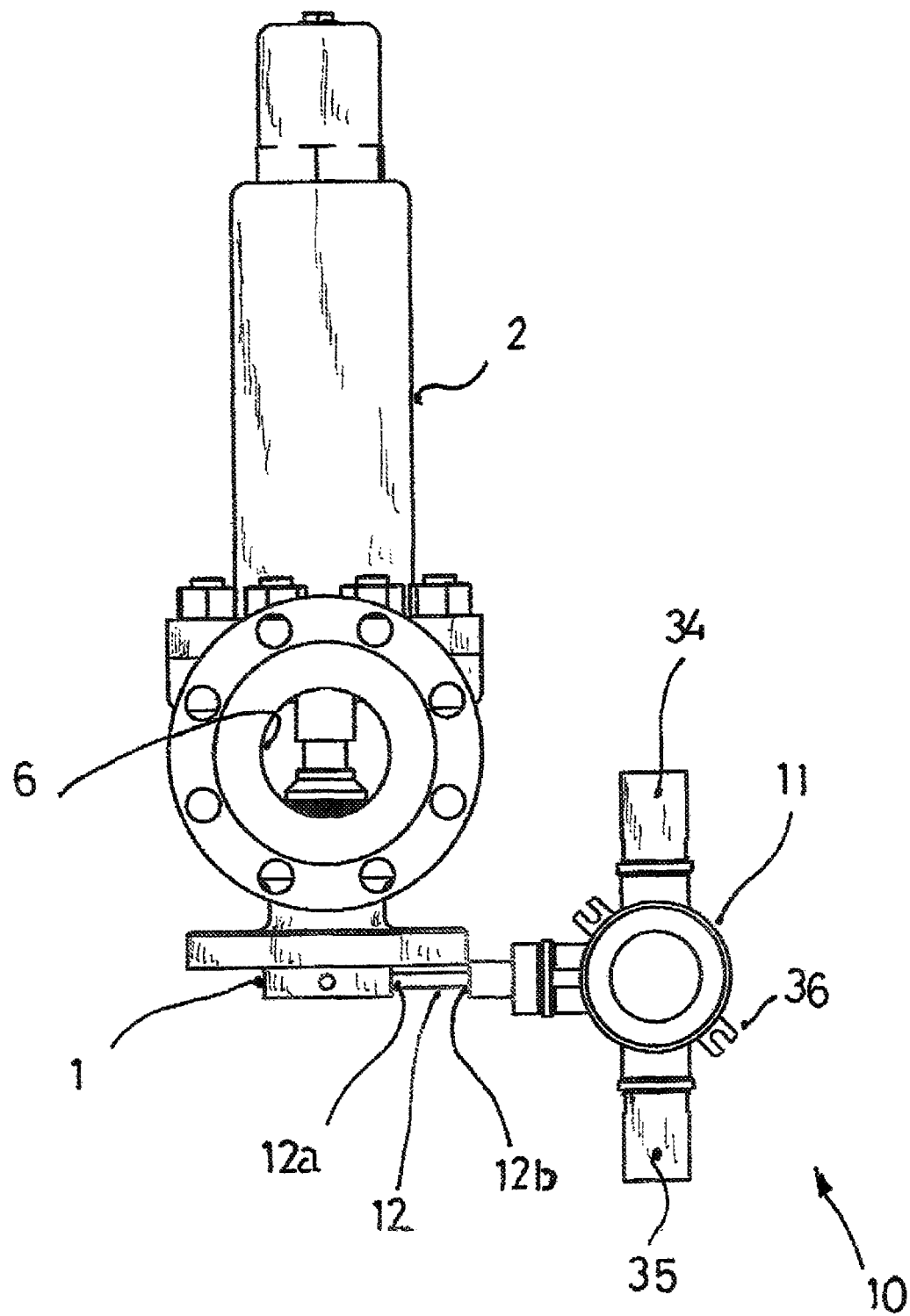
FIG. 2 is a side elevation view of a state-of-the-art safety valve, with the module of the present invention coupled in intimate contact with an external lateral portion of the valve nozzle body.

The outgoing relief flow acquires its escape route through the opening (6) arranged in the casing or valve body (2), in correspondence with the closing seat (3, 4) of the nozzle (1) (See FIG. 2).

The present invention is constituted by a modular component generically indicated by the reference (10), consisting of a hermetic and explosion-proof casing or box (11) and a rigid longitudinal element (12) inextensible at room temperature, defining an acoustic emission waveguide capable to transmit events originating inside the valve. To this end, the waveguide (12) is conveniently a rod, one of whose ends (12a) is intimately in connection with the valve's outer casing.

Figure 4:
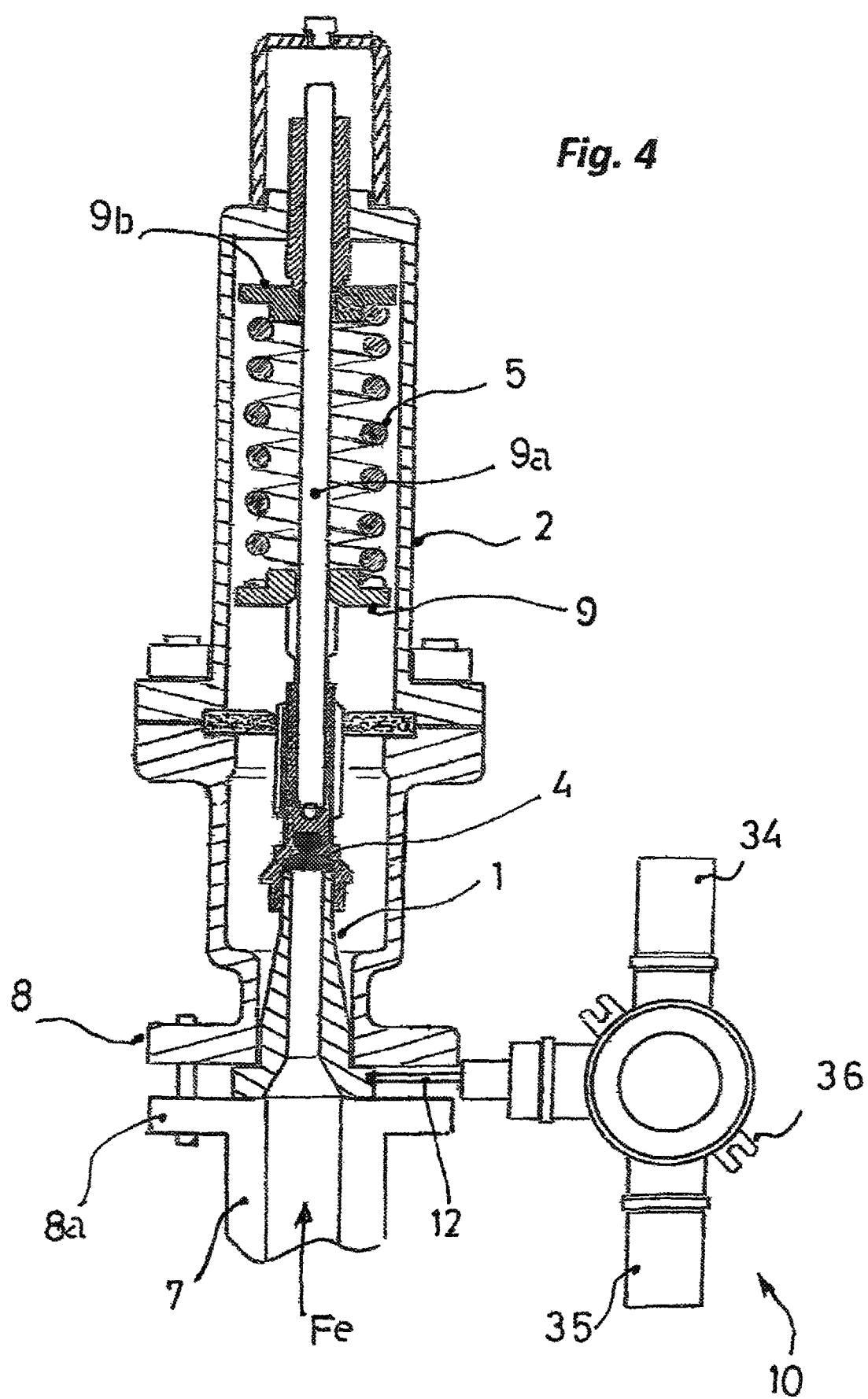
FIG. 4 is a schematic and simplified vertical section of a valve according to the construction of FIG. 2.

FIGS. 2 and 4 show the preferred connection mode of the waveguide (12) which is welded at its end (12a) to a portion of the nozzle (1) protruding from the base of the valve body (2), while its distal end (12b) penetrates inside the hermetic box (10). FIG. 4 conveniently shows that the valve body (2) has a lower flange (8) coupled in communication with the flange (8a) of the valve coupled to container or generic device (7) controlling the parameters inside (17) by means of the module of the invention, even though this arrangement does not constitute any limitation to the scope of the present invention.

Figure 3:
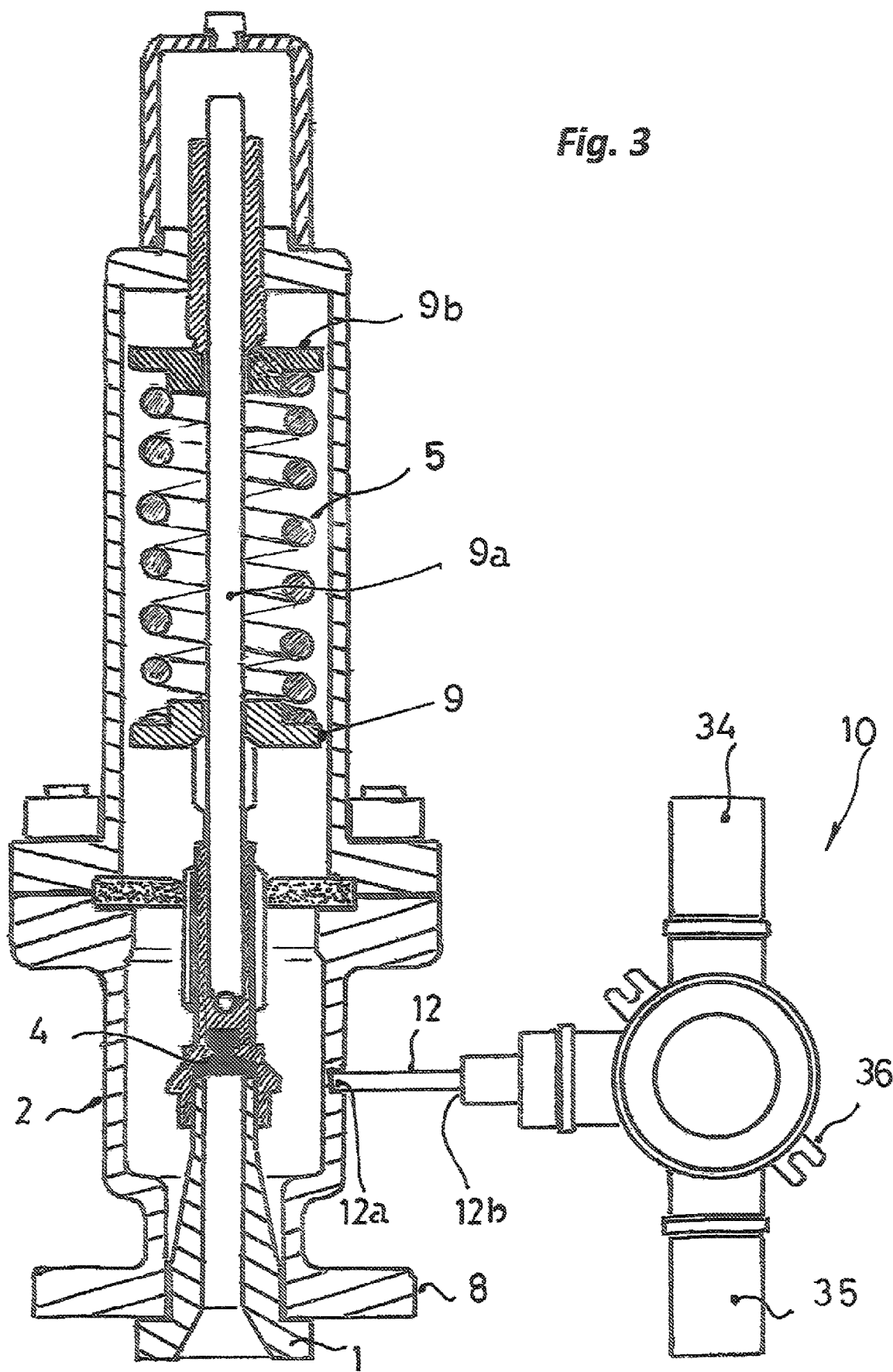
FIG. 3 is a schematic and simplified vertical section of a valve with the module of the invention externally attached to a lateral of the valve's casing.

FIG. 3 shows another possible mode of linking the waveguide (12) which is here welded at its end (12a) to a portion of the external casing or cap (2) of the valve, while the opposite end (12b) of (12) penetrates inside the hermetic box (10).

The guiding physical principle used in the present invention is the acoustic emission which allows treating continuous and/or transient vibratory signals since both define an ultrasonic wave signature representative of the different states within the valve. As already explained in the previous paragraph [0017], this instant invention allows detecting and quantifying the four operating states of a safety or relief valve using a single sensor. Any actual or future device allowing detecting the sound waves caused inside the valve during its operation is useful acting like a sensor, applicable to the present invention. The preferred sensor used in the present invention, without this entailing any limitation to its scope, are piezoelectric ceramics, which when used in their function as sensors provide a wide dynamic range, detecting signals that differ in intensity a million times. These types of sensors are absolutely passive and they do not emit energy of its own in the form of signals to the valve.

Said waveguide (12) is preferably constituted by a straight rod with a length between 3 and 50 cms. capable of transmitting with negligible attenuation the vibratory energy generated by the different events inside the valve and directed towards the acoustic emission sensor (See FIGS. 9 to 12), connected at the end (12b) of the waveguide. The material from which the waveguide (12) is manufactured, has the same characteristics as the material from which the valve body (2) or nozzle (1) is made and to which said rod is attached. The parameter defining the equality of characteristics in the materials is established in terms of "acoustic impedance". Due to the interface at the junction between the waveguide (12) and the valve (1, 2), the mechanical vibrations that carry through said interface suffer a proportional reflection (1−Z1/Z2), with Z1 and Z2 being the acoustic impedances of the interface materials. It is observed that materials with the same acoustic impedance Z1=Z2 result in a reflection equal to zero, maximizing the transmission of vibrations at the interface, resulting in greater energy at the opposite end of the waveguide (12b) wherein the sensor (13) is located providing an acoustic emission with enhanced sensitivity to the entire system, especially in the loss of flow measurement that is 1,000,000 times smaller than the other events taking place within the valve, such as the opening and closing phases of the valve's shutter. The end of the waveguide (12b) can have attached to it the acoustic emission sensor (13), a pressure transmitter sensor (15) and other sensors, for example a fluid temperature sensor (14) (See FIGS. 11 and 12). This sensitive end (12b) of the waveguide (12) is threaded into a hermetically sealed box (11), certified explosion proof, or employed in connection with dangerous atmospheres.

If the component (12), beside said vibrations, must also sense the internal pressure at (7), said waveguide (12) is provided with a longitudinal perforation (16) and a standardized thread fitting therewith a pressure transmitter of in such a way the pressure within the valve can be recorded at the same time as the state of the shutter. Also inside said explosion-proof box (11) is placed preferably the electronics conditioning and processes the signal proportional to the vibrations delivered by the acoustic emission sensor (13).

Figure 5:
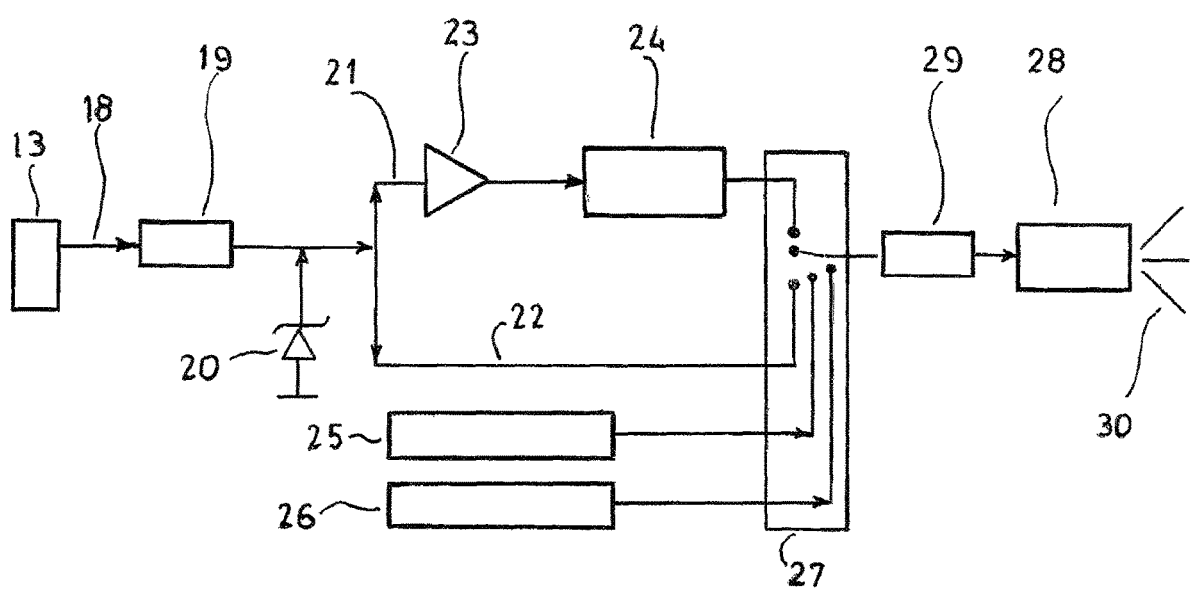
FIG. 5 is a block diagram of the electronic circuit housed inside the hermetic box.

FIG. 5 shows the block diagram of the electronics generating and transmitting the information collected from the sensors. The acoustic emission signal is carried by the waveguide (12) to the sensor (13) whose resonance frequency is around 40 KHz. The output (18) of this sensor (13) enters a multipole high pass filter (19) selecting the frequencies of interest. After (19) there is a voltage limiter (20) with parallel branch output, formed by two branches, an upper branch (21) and a lower branch (22).

The function of the voltage limiter is to ensure that the voltage reaching the amplifiers (23) does not exceed its threshold value. The object of this parallel (21, 22) is to measure the different states of the valve with the least error. Safety valves have four possible states, three of them transitory, namely: opening mode, discharge and closing mode, whose signals are processed by the lower branch (22) and the remaining event is a continuous state, which may or may not exist, due to a loss of flow, originating a signal processed through the upper branch (21) of the parallel. The intensity of the loss of flow is measured in RMS values since it has a Gauss-type probability distribution and its intensity relative to the other states is one million times lower. The transitory states (opening and closing mode) are measured in Volts/seconds and are recorded in tables as a function of time. In the upper branch (21) it is observed the aforementioned amplifier (23), which allows the voltage levels to be brought to those necessary to carry out the measurement with a minimum error, and the converter (24) to the mean square RMS value. As already mentioned, the lower branch (22) deals with transient states and does not need an amplifier. The electronics in turn contains two analogic interfaces (25, 26) with a 4-20 mA standard to connect and record two sensors (14, 15) whose physical variables can be pressure, temperature, and flow rate, between others.

The reading of these sensors (13, 14, 15) is carried out at the same time (synchronized) with the several states of the valve.

The output of both branches (21, 22) connects with an analogic selector key (27) that selects the analogic variable to be converted. The switching of this key is carried out by the controller (28). The output of this analogic key (27) enters as an input into an ADC converter (29) wherein the signal is transformed from an analogic signal to digital signal.

Finally, a microprocessor system, memory and communication interface manipulates, stores and transmits the information collected by the system to higher levels of information such as control panels, SCADAs, web pages, databases in the cloud, etc. through an outlet connection (30).

A notable advantage of the present invention is given by the fact that the electronic measurements of the discharge flow and loss flow can be calibrated with suitable workbenches to offer a representative estimate of the discharge and loss flows, allowing the system to estimate costs without having to take the valve to an expensive test bench.

Another novel and undeniable advantage of the present invention is provided by the modular feature offered by the "Waveguide/Sensors/Box Anti-explosive" unit available as an independent unit of the valve, constituting a "kit" suitable to be installed on any valve actual and known valve in service, by means of fixings such as welding or clamps both on the outside of the valve body (2) or to a portion of the nozzle (1) and immediately offer the functionalities of an "instrumented valve" without having to remove or disassemble, much less machine the pre-existing valve.

Figure 6:
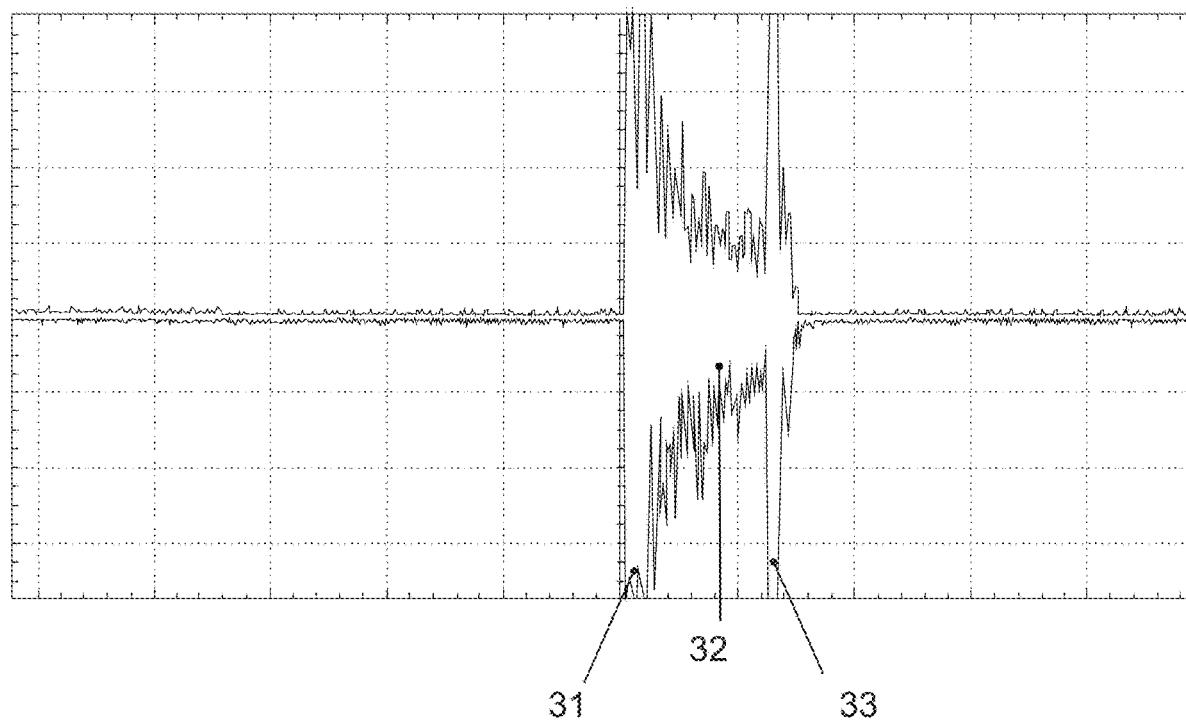
FIG. 6 represents an oscilloscope record sampling a transient event taking place inside the valve.

FIG. 6 allows to observe on the screen of an oscilloscope the three transitory states, namely, opening, discharge and shutter mode of the valve registered through an acoustic emission sensor in physical connection with the valve body through the above-mentioned waveguide. The recording begins with the opening of the shutter breaking its sealing seat, a brief but high-intensity event that is indicated by (31) on the oscilloscope; then occurs the discharge of fluid indicated in (32) whose vibratory intensity decreases as the internal pressure causing the event decreases with the outflow, and finally it is observed the vibration (33) of the closing blow or shutter sealing once more the relief valve.

The steady state event of the low loss has an intensity of around 120 dB in reference to the opening and closing intensity if we consider the peak value with respect to the RMS. This is an approximation because the noise has a bad shape factor and also has a preponderant spectral component that is the resonance of the acoustic emission sensor (13). Even so, it is possible to associate the RMS value of the loss with the flow rate. It follows then that by measuring the RMS value of the flow loss and calibrating the system with a test bench based on adequate flow meters and manometers, the economic value (total volume) of the flow loss can be established in real time and the consequent need for maintenance service, valve maintenance or replacement thereof.

In order to record the flow loss in the valve, amplifiers with gains in the order of 80 dB and high-pass filters (19) must be used, with multiple poles, with a cut-off frequency of 40 kHz, which corresponds to the resonance frequency of the acoustic emission sensor (13). The difference in intensity between the transient events and the stationary event (flow loss) require the availability of different electronics to measure the types of events, the acoustic emission sensor (13) being unique by virtue of its extended dynamic range.

Figure 7:
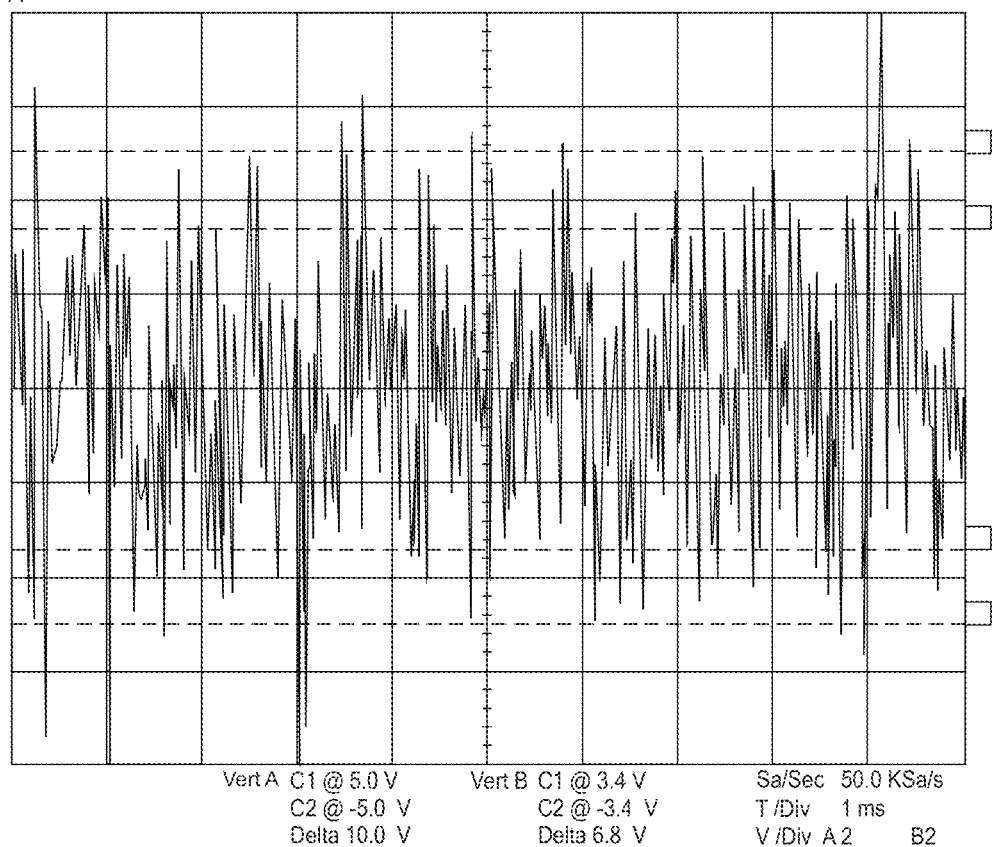
FIG. 7 illustrates on an oscilloscope screen the noise caused by a loss of constant flow when the nozzle plug fails, with RMS of −120 dB with respect to the opening peak value.

The above is the justification for the existence of the two parallel branches of the electronic circuit (21, 22), each with its own electronic characteristics. FIG. 7 shows on the oscilloscope screen the noise originated from the flow loss with RMS of −120 dB with respect to the valve's shutter opening peak.

Conveniently, and in order to promote a simple autonomous installation of the integrated and modular device of the invention to any type, model and brand of valve, that is, a universal modular element externally attachable to any safety valve of any origin, the sensor assembly and all the electronics are housed inside a certified anti-explosive box, which enables the modular device of the invention to be installed in places with explosion hazard atmospheres.

The block (28) of FIG. 5 is constituted by a microprocessor capable of performing the signals measurements and establishing the wired or wireless communications which are routed through various interfaces to the internal networks or to the global web, symbolized by the reference (30) in said figure. For this purpose, in FIGS. 2, 3 and 4, the wireless communication connection antenna is indicated with (34), being (35) the housing, while (35) indicates the housing of the batteries, for example, Li batteries, all with MODBUS TCP/IP communication protocol. Alternatively, instead of the battery housing (35), the modular device of the invention contemplates placing in (35) an electrical connection to the electrical network, housing in (35) the voltage transformers and rectifiers deemed necessary.

Since the device of the invention is modular and external, it can be secured to any structure that does not interfere vibrating with the sensor (13) through the linkage means generically indicated with (36).

Figure 8:
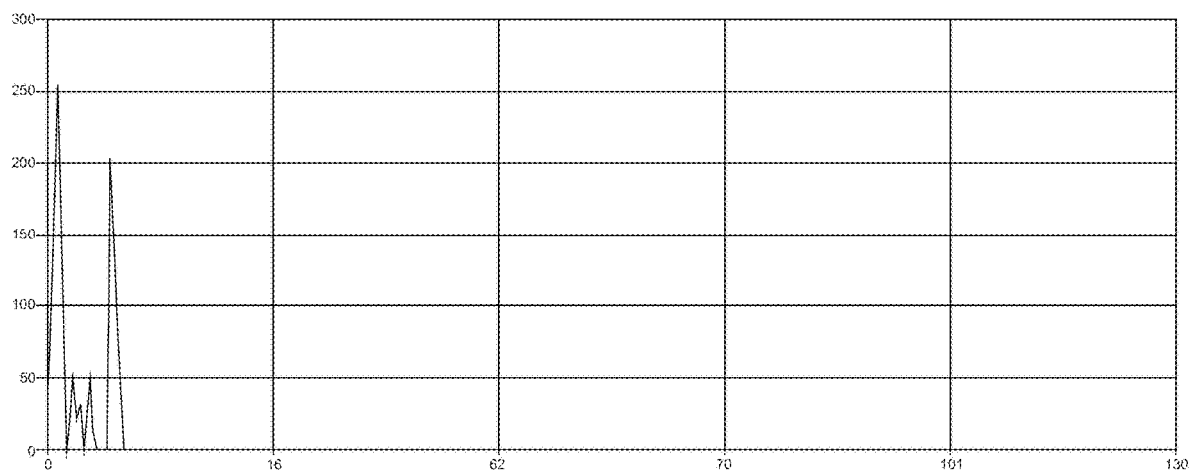
FIG. 8 is a timing diagram representative of a valve's opening, unloading and closing event.

FIG. 8 shows a detail of the envelope of transient events that allow correlating times and flows.

Figure 9:
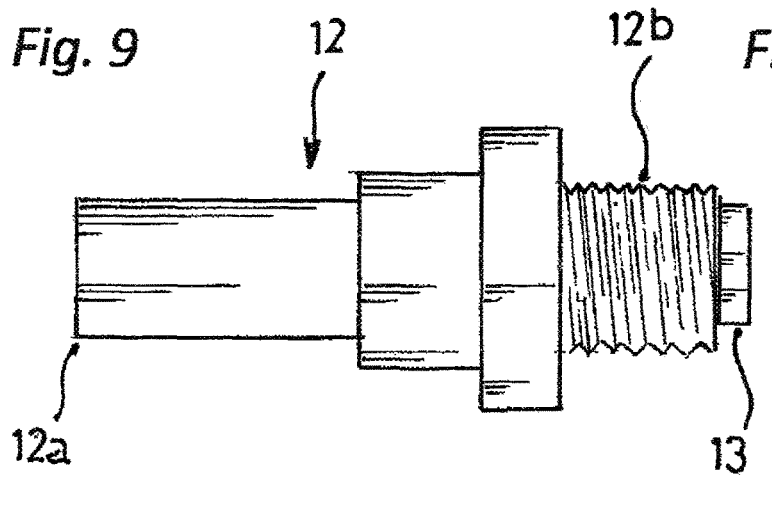
FIG. 9 illustrates a side projection view of the acoustic emission waveguide at the end of which a single acoustic emission sensor is installed.
Figure 10:
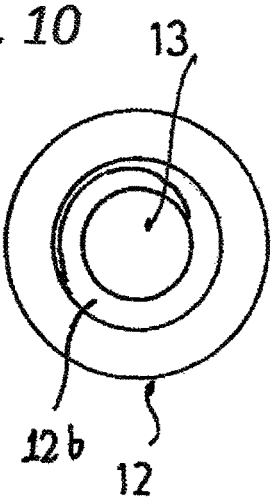
FIG. 10 illustrates a front projection view of the end of the acoustic emission waveguide with a single acoustic emission sensor in the foreground.

FIG. 9 illustrates a side projection view of the acoustic emission waveguide (12) wherein at its end (12b) a single acoustic impedance sensor (13) is installed, housed inside the box (11). Said end (12b) has a thread suitable for compliance with anti-explosion box regulations, engaging a complementary female thread at one of the walls of said box (11) (not illustrated in these figures). FIG. 10 illustrates a front projection view of the end of the acoustic emission waveguide (12b) with the single acoustic emission sensor (13) in the foreground.

Figure 11:
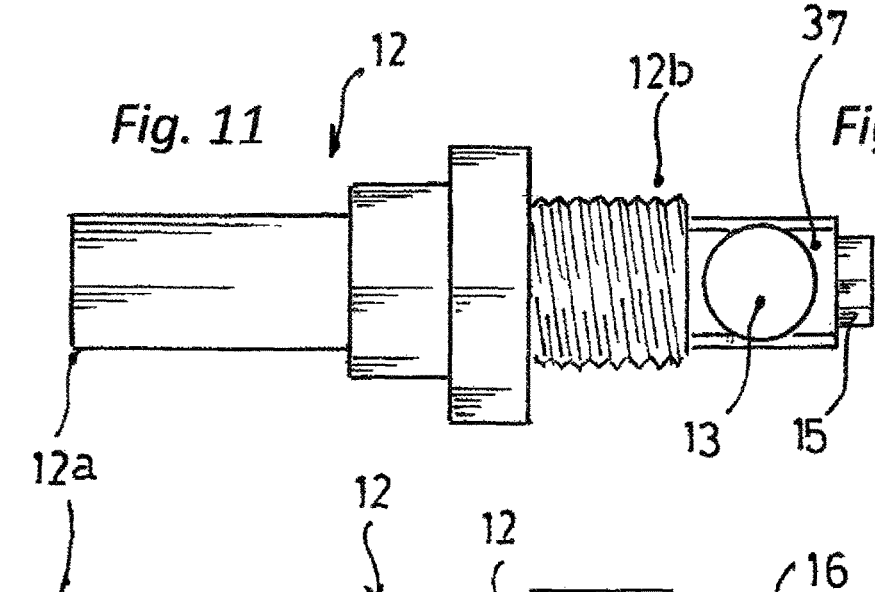
FIG. 11 illustrates a side projection view of the acoustic emission waveguide at whose end a plurality of sensors is installed, including the acoustic emission sensor.
Figure 12:
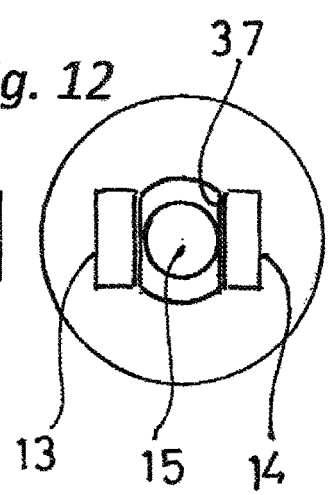
FIG. 12 illustrates a front projection view of the end of the guide of acoustic emission waves showing a plurality of sensors in the foreground.

FIG. 11 illustrates a side projection view of the acoustic emission waveguide (12) at whose end (12b) a plurality of sensors is installed, one of them being a pressure sensor (15) including the sensor of acoustic emission (13) which is solidary against a lateral recess (37) made in the end (12b) that houses inside the box (11) (FIG. 12).

Figure 13:
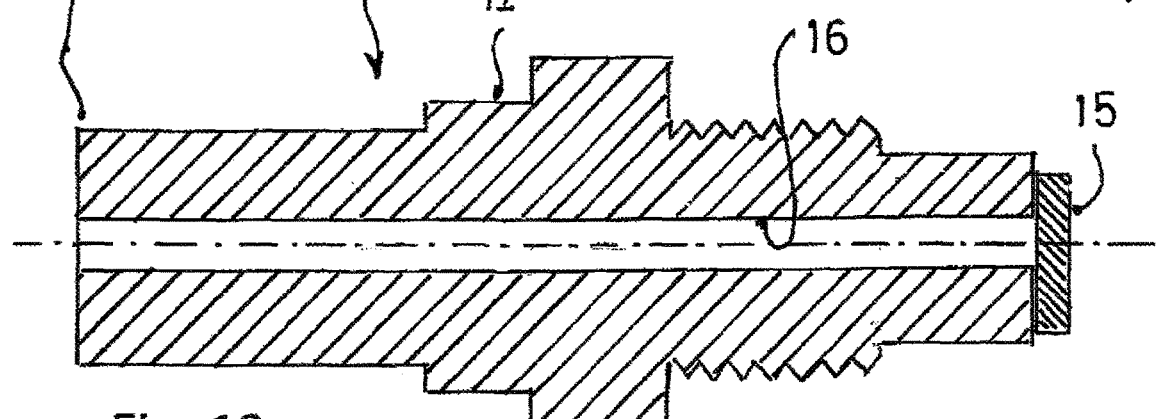
FIG. 13 shows a longitudinal section of FIG. 12.

FIG. 13 shows a longitudinal section of FIG. 12 in which the existence of an axial hole (16) is observed communicating the interior of the valve enclosure with the interior of the box (11), with the interposition of a pressure sensor (15) housed inside said box (11).

The invention claimed is:

1. A data retrieval, event recording, and transmission module connectable to a safety and relief valve, the module comprising:
    an inextensible at room temperature longitudinal rigid element defining an acoustic emission waveguide; the longitudinal rigid element transmits vibrations representative of events originating inside the valve;
    a first end of said longitudinal rigid element is in intimate contact with a portion of an outer surface of the valve;
    a second end of said longitudinal rigid element penetrates inside a hermetically sealed resistant box, seating in intimate contact against at least one sensor device capable of sensing vibratory signals housed within said hermetically sealed box;
    at least one acoustic emission sensor receiving a signal proportional to the vibrations transmitted by means of the waveguide;
    wherein said signal enters an electronic circuit defined by a multipole high-pass filter that selects frequencies;
    the output of said high pass filter enters a voltage limiter whose output is divided into a first branch and a second branch;
    the first branch measures the signal of continuous states and includes an amplifier medium followed by an RMS value meter on line, the second branch measures transient states;
    wherein an output of the first and of the second branches enter into an analogic selector switch capable of selecting the analogic variable to be converted, aid key being commanded by a controller medium; and
    wherein the output of said analogic key enters an ADC converter medium whose output feeds the input of an information communicator medium with the outside of the module by emitting a transferable, legible or recordable signal.

2. The transmission module according to claim 1, wherein the waveguide is a straight rod with a length between 3 cm and 50 cm. having the same material characteristics of the valve body or nozzle where it is fixed, being the parameter defining the equality of characteristics in the materials established in terms of "acoustic impedance"; having the end of said waveguide welded or stapled against the outside of the cap or casing of the valve or against a protruding part of the same nozzle.

3. The transmission module according to claim 1, wherein the acoustic emission sensor is a piezoelectric.

4. The transmission module according to claim 1, wherein the at least one sensor device include a temperature sensor and a pressure sensor.

5. The transmission module according to claim 4, wherein when one of the at least one sensor device is a pressure sensor, the waveguide is constituted by a rod with an internal hole defining an open passage at both ends, seating against the end arranged inside the hermetic box to the pressure sensor.

6. The transmission module according to claim 1, wherein the hermetically sealed resistant box defines an explosion-proof enclosure.

7. The transmission module according to claim 1, wherein the communication medium of the information with the outside is a microprocessor.

8. The transmission module according to claim 1, wherein the hermetically sealed resistant box has a wireless communication antenna, said electronic circuit being powered by a source of electrical energy chosen from batteries housed in an enclosure linked to the hermetically sealed resistant box and a source of external electrical source.

9. The transmission module according to claim 1, wherein the hermetically sealed resistant box is fixed independently of the body of the valve constituting a device capable to retrieve and transmit vibrations and parameters of the fluid in communication with the interior of the nozzle applied to any pre-existing valve.

* * * * *